United States Patent [19]

Feeny

[11] 3,857,692

[45] Dec. 31, 1974

[54] 1,2-DIMETHYL-3,5-DIPHENYLPYRAZOLIUM SALTS AND 3,5-DIBROMO-4-HYDROXYBENZONITRILE HERBICIDAL COMPOSITIONS

[75] Inventor: Richard William Feeny, Hightstown, N.J.

[73] Assignee: American Cyanamid Company, Stamford, Conn.

[22] Filed: Nov. 17, 1972

[21] Appl. No.: 307,671

[52] U.S. Cl............................ 71/92, 71/86, 71/88, 71/93, 71/103, 71/105, 71/106, 71/111, 71/115, 71/117, 71/120, 71/122, 260/311
[51] Int. Cl........................... A01n 9/02, A01n 9/22
[58] Field of Search .............. 71/92, 105; 260/311

[56] References Cited
UNITED STATES PATENTS

| | | | |
|---|---|---|---|
| 3,330,640 | 7/1967 | Luckenbaugh | 71/92 |
| 3,458,305 | 7/1969 | Doyle | 71/92 |
| 3,630,895 | 12/1971 | Krause et al. | 260/311 |
| 3,736,121 | 5/1963 | Zeeh et al. | 71/92 |

FOREIGN PATENTS OR APPLICATIONS

| | | | |
|---|---|---|---|
| 13,030 | 7/1964 | Japan | 71/92 |
| 1,030,249 | 5/1966 | Great Britain | 71/105 |

OTHER PUBLICATIONS

Elguero et al., "Synthése eb spectres de résonance etc.," (1968), Bull. Soc. Chim. Fr. 1969, pp. 1687–1689, 95–98, (1969).

Primary Examiner—Glennon H. Hollrah
Attorney, Agent, or Firm—H. G. Jackson

[57] ABSTRACT

This invention relates to novel compositions and methods for the control of wild oats (Avena spp.) and other grass weeds and broadleaf weeds with the compositions. More particularly, the novel herbicidal compositions contain a 1,2-dialkyl-3,5-diphenylpyrazolium salt and a non-hormonal herbicidal agent for the control of undesirable broadlead and grass plants.

8 Claims, No Drawings

3,857,692

1,2-DIMETHYL-3,5-DIPHENYLPYRAZOLIUM SALTS AND 3,5-DIBROMO-4-HYDROXYBENZONITRILE HERBICIDAL COMPOSITIONS

CROSS REFERENCE TO RELATED APPLICATION

The herbicidal activity of some of the 1,2-dialkyl-3,5-diphenylpyrazolium salts useful in the compositions of this invention is reported in the Klingsberg and Walworth copending U.S. application Ser. No. 307,672 filed of even date.

BACKGROUND OF THE INVENTION

1. Field of the Invention

The invention pertains to chemical compositions for killing undesirable vegetation.

2. Description of the Prior Art

While phenylcarbamates, substituted-ureas, substituted-hydroxybenzonitrile, dinitrophenols and substituted-symmetrical triazines are well known and have been used commercially as herbicidal agents for control of broadleaf weeds and grass weeds, these compounds have only moderate or no effect on wild oats, such as *Avena fatua*, *Avena sterilis* and *Avena ludoviciana* when applied postemergence at rates of application generally used for weed control in the presence of economic crops. This finding, in itself, would not normally be considered particularly important were it not for the fact that the most effective wild oat herbicides are generally inactivated when used in admixture with other pesticides, particularly other herbicidal agents. This is evidenced by the fact that the most widely accepted wild oat herbicides, 4-chloro-2-butynyl N-(3-chlorophenyl)-carbamate (BARBAN) and the ethyl ester of N-benzoyl-N-(3,4-dichlorophenyl)alanine (SD-30053), are not recommended for use in combination with other herbicides. For example, J. D. Nalewaja, North Dakota State University, Fargo, North Dakota, reported in the research report of the North Central Weed Control Conference, pages 32–33, 1971 in a paper entitled "SD-30053 Plus Broadleaf Herbicides", that at one pound per acre SD-30053 alone, applied at the four-leaf stage of wild oats gave 70% control of wild oats. However, when applied in admixture at the same one pound per acre rate for SD-30053 plus 6 or 12 ounces per acre of 2,4-D wild oat control dropped to 29 and 25%, respectively. Similarly, addition of 2 and 4 ounces per acre of DICAMBA to SD-30053 and 4 or 8 ounces per acre of BROMOXYNIL to SD-30053 reduced wild oat control to 29, 24, 53, and 53% respectively. DICAMBA is 2-methoxy-3,6-dichlorobenzoic acid; BROMOXYNIL is 3,5-dibromo-4-hydroxybenzonitrile and 2,4-D is 2,4-dichlorophenoxyacetic acid.

It was, therefore, surprising to find a compound (i.e. a 1,2-dialkyl-3,5-diphenylpyrazolium salt) that is not only selective for wild oats in the presence of agronomic crops but is also compatible in admixture with a variety of herbicides used for control of braodleaf weeds and grasses.

SUMMARY OF THE INVENTION

The invention is novel compositions and methods for the control of wild oats and other grass weeds or broadleaf weeds, and involves applying to the foliage of the undesirable plant species a herbicidally effective amount of the composition containing (a) a pyrazolium salt of the formula:

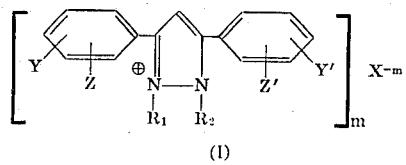

(I)

wherein $R_1$ is methyl; $R_2$ is alkyl $C_1$–$C_4$; Y, Y' Z and Z' each independently represent hydrogen, halogen, methyl or methoxy; X is an anion having a charge of from 1 to 3; m is an integer 1, 2 or 3, and provided that only one phenyl ring in the formula can be substituted on the carbon para to the pyrazolium ring with a substituent other than hydrogen; and (b) a non-hormonal herbicidal agent effective for the control of undesirable broadleaf and grass plants.

Among the preferred non-hormonal broadleaf and grass herbicides which I have found to be compatible with the above-identified pyrazolium salts are: phenylcarbamates, substituted-ureas, substituted-hydroxybenzonitriles, substituted-symmetrical triazines and dinitrophenols and salts thereof (substituted or unsubstituted).

The phenylcarbamates useful in the compositions of this invention can be illustrated by the formula:

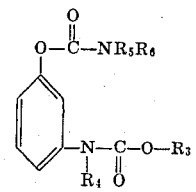

where $R_5$ is alkyl, cycloalkyl, or aryl optionally substituted by halogen, alkyl or $CF_3$; $R_6$ is hydrogen or alkyl, and when $R_5$ and $R_6$ are taken together they form a heterocyclic residue optionally containing nitrogen or oxygen atoms; $R_3$ is alkyl, alkenyl or alkynyl all optionally substituted with a terminal halogen; and $R_4$ is hydrogen or alkyl.

Substituted-ureas useful in the compositions of this invention can be illustrated by the formula:

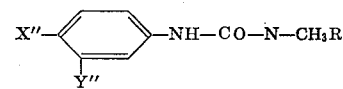

where X'' is halogen, lower alkyl or lower alkoxy; Y'' is hydrogen, halogen, lower alkyl, alkoxy, alkylthio, alkylsulphinyl, alkylsulphonyl, nitro or lower haloalkyl; and R is hydrogen, lower alkyl optionally substituted by one or two lower alkoxy groups; lower alkoxy, allyl or n-butenyl.

Substituted-hydroxybenxonitriles which are compatible with the pyrazolium salts referred to above and which can also be used in the compositions of the present invention are the 3,5-dihalo-4-hydroxybenzonitriles including the 3,5-dichloro-, 3,5-dibromo-, 3,5-diiodo- and 3,5-difluoro-4-hydroxybenzonitrile.

The substituted triazines which can be used in the compositions of the present invention are represented by the formula:

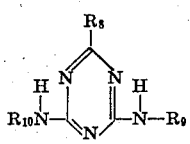

where $R_8$ is halogen, alkoxy $C_1$–$C_4$ or alkylthio $C_1$–$C_4$; $R_9$ is alkyl $C_1$–$C_4$ (straight or branched) or —$C(CH_3)_2CN$; and $R_{10}$ is alkyl $C_1$–$C_4$ (straight or branched).

Phenols which can be used in the compositions of this invention have the formula:

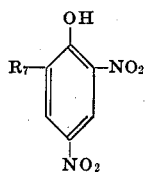

where $R_7$ is hydrogen or alkyl $C_1$–$C_4$ (straight or branched) and the alkanolamine salts thereof.

Preferred herbicidal compositions contain, in addition to the 1,2-dialkyl-3,5-diphenylpyrazolium salt, a compound selected from the group consisting of 3,5-dibromo-4-hydroxybenzonitrile; N'-(3-chloro-4-methylphenyl)-N,N-dimethylurea; 3-methoxycarbonylaminophenyl-N-(3'-methylphenyl)-carbamate; N-(3-chloro-4-methoxyphenyl)-N,N-dimethylurea, 2-methylthio-6-tert-butylamino-4-ethylamino-1,3,5-triazine; 2-chloro-4,6-bis-(ethylamino)-1,3,5-triazine; 2,4-dinitrophenol and 2-sec-butyl-4,6-dinitrophenol.

In addition to the compositions referred to above, wherein the compositions are admixtures of a pyrazolium salt and a broadleaf or grass herbicide, where the dinitrophenol salt is employed a salt can be formed comprising the pyrazolium cation and the dinitrophenol anion. This new salt has the structure:

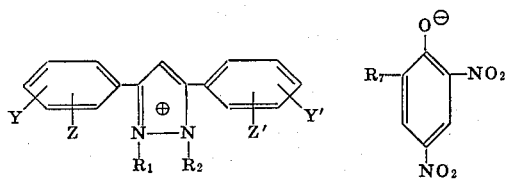

where $R_1$, $R_2$, Y, Y', Z and Z' are as described above; and $R_7$ is hydrogen or alkyl $C_1$–$C_4$.

With regard to the pyrazolium compounds (I) identified by the above structure, suitable halogen substituents include fluoro, chloro, bromo and iodo. However, chloro, fluoro and bromo are preferred.

Suitable anions include, for example, halides, such as chloride, bromide or iodide, acetate, sulfate, hydroxide, hydrogen sulfate, methyl sulfate, benzene sulfonate, $C_1$–$C_4$ alkoxy benzene sulfonate, $C_1$-$C_3$ alkyl benzene sulfonate, preferably toluenesulfonate, such as p-toluenesulfonate, nitrate phosphate, carbonate, hydrogen, carbonate, $C_1$–$C_4$ alkane sulfonate, chlorate, perchlorate, thiocyanate, $Br_3^-$, $I_3^\ominus$ and 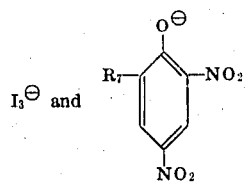

In this specification and claims, the term "lower" when used with a chemical grouping, such as alkyl, alkoxy, or the like, means that said group contains 1 to 4 carbon atoms. Where the chemical group is not modified by the prefix "lower", the terms alkyl, alkoxy, alkylthio, alkylsulphinyl, alkylsulphonyl, and the like, contain 1 to 6 carbon atoms. Cycloalkyl, aryl and heterocyclic have from 3 to 8 carbon atoms.

In addition to the phenylcarbamates, substituted-ureas, substituted-hydroxybenzonitriles, substituted-dinitrophenols and substituted-symmetrical triazines which can be used in combination with the 1,2-dialkyl-3,5-diphenylpyrazolium salts, it is also found that 5-amino-4-chloro-2-phenyl-3(2H)pyridazinone is compatible.

DESCRIPTION OF THE PREFERRED EMBODIMENTS

In accordance with this invention, the novel herbicidal composition comprising a 1,2-dialkyl-3,5-diphenylpyrazolium salt and a broadleaf herbicidal agent or a grass herbicide is generally dispersed in water and applied as an aqueous spray to the foliage of the undesirable plants. Water soluble salts of the pyrazolium and a wettable powder, flowable liquid or emulsifiable concentrate of the broadleaf or grass herbicide are generally dispersed in water and applied as such to the foliage of the undesirable plants. Generally, a surfactant, spreader, sticker, or the like, is added to the mixture to improve leaf and stem penetration. Usually about 0.1 to 5.0%, and preferably 0.5 to 3.0%, of a surfactant is added to the solution or dispersion, and such surfactant can be selected from nonionic, anionic, cationic and nonionic-anionic blends. Among the preferred surfactants are alkyl aryl polyglycol ethers, alklphenol ethoxylates, trimethyl nonyl polyethylene glycol ether, nonylphenol ethylene oxide condensate, alkylphenol ethylene oxide condensate, alkyl polyoxyethylene ethers, polyoxyethylene sorbitan monolaurate, octylphenoxy, polyethoxy ethanol, stearaminopropyldimethyl-β-hydroxyethylammonium nitrate and dicocodimethylammonium chloride. The pyrazolium salts and the other herbicides may also be individually prepared as wettable powder formulations, emulsifiable concentrates, or the like, and mixed in the spray tank in the field. Any of the commercially available broadleaf and grass herbicidal formulations may, of course, be used.

The compositions of this invention are useful for controlling wild oats and broadleaf weeds or grass weeds and can be employed in the presence of several crops, such as wheat, barley, rye, flax, peas, sugar beets, rape or sunflower.

For effective control of undesirable plants, the herbicidal composition is normally applied in sufficient amount to provide from about 0.25 pound to 2.0 pounds per acre, and preferably 0.50 pound to 1.0 pound per acre, of the pyrazolium cation, and from about 0.25 pound to 5.0 pounds per acre, and preferably 0.50 pound to 4.0 pounds per acre, of the nonhormonal broadleaf or grass herbicide.

Example 1 and Table I illustrate the herbicidal use of the compositions of the invention. The tests were conducted to demonstrate the compatability of non-hormonal herbicidal agents and pyrazolium salts for the control of wild oats. Example 2 illustrates a method for preparing a new compound of the invention 1,2-dimethyl-3,5-diphenylpyrazolium-2-sec-butyl-4,6-dinitrophenolate.

EXAMPLE 1

In these tests, wild oats (*Avena fatua*) are grown in flats in the greenhouse until they reach the four-leaf stage. They are then sprayed with an aqueous solution containing a sufficient amount of test compound to provide 0.60 pound per acre of the pyrazolium cation. For comparison, test compounds are used alone and in combination with 3,5-dibromo-4-hydroxybenzonitrile, added in sufficient amount to provide 0.125 pound per acre of said compound.

All test solutions are prepared in such a manner as to contain about 0.1% by weight of the biodegradable nonionic linear alkyl polyoxyethylene ether marketed by Union Carbide Corporation as "Surfel 4884." Untreated plants are used as controls, and four weeks after treatment the foliage of all plants is harvested and weighed.

Data obtained are reported in Table I below, where it can be seen that the addition of 3,5-dibromo-4-hydroxybenzonitrile to solutions containing a 1,2-dialkyl-3,5-diphenylpyrazolium salt provided a compatible mixture for the control of wild oat.

When the above tests are repeated using wild oats (*Avena fatua*), yellow rocket, wild mustard and ball mustard, it is found that solutions containing only 3,5-dibromo-4-hydroxybenzonitrile, which are applied in sufficient amount to provide ⅛ lb./acre of said compound, provides no control of wild oats. However, 100% control of yellow rocket, wild mustard and ball mustard is obtained with this solution. Moreover, when the pyrazolium compound is added to the solution, as indicated above, and the solution is applied to the above-named plant species in sufficient amount to provide 0.6 lb./acre of said pyrazolium cation, the percent inhibition of wild oats is found to be approximately 80% or more as shown in Table I below. It is also found that such solutions provide 100% control of yellow rocket, wild mustard and ball mustard.

Results comparable to those in Table I are obtained using other herbicidal compositions of the invention.

tion is then evaporated and azeotroped several times with toluene/acetone (dry). Hexane/acetone (approximately 5%) is added to the residue and it solidifies. The mixture is filtered, washed with hexane and dried to give the product 1,2-dimethyl-3,5-diphenyl-pyrazolium-2-sec-butyl-4,6-dinitrophenolate which is useful as a herbicide.

This same procedure can also be employed for the preparation of 1,2-dimethyl-3,5-diphenylpyrazolium-4,6-dinitrophenolate by substituting 4,6-dinitrophenol for 2-sec-butyl-4,6-dinitrophenol in the above reaction. These compounds are useful as herbicides.

The preparation of the formula (I) pyrazolium salts, useful in the compositions of the invention is described hereinbelow.

The pyrazolium salts (I) useful in the compositions of the invention are conveniently prepared by first condensing the appropriate diketone with hydrazine or a $C_1$–$C_4$ lower alkyl hydrazine to form the corresponding 3,5-diphenylpyrazole. Thereafter, said pyrazole is alkylated to form the desired formula (I) pyrazolium salt.

Where hydrazine is employed in the condensation, alkylations are effected at the 1 and 2 positions. Where a lower alkyl hydrazine is employed in the initial condensation, alkylation is effected at the 2 position. These reactions are graphically depicted as follows:

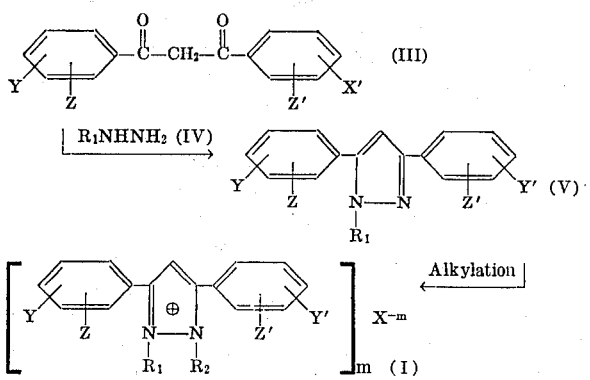

TABLE I
[Effect of broadleaf herbicides on performance of 1,2-dialkyl-3,5-diphenylpyrazolium salts]

| Structure | Rate, lb./acre | Percent inhibition of wild oat foliage weight | |
|---|---|---|---|
| | | No Bromoxynil | ⅛ lb./acre Bromoxynil |
| [Structure with CH₃, pyrazolium N⊕—N, CH₃ CH₃, and SO₂—O⊖ phenyl] | 0.6 | 79 | 89 |
| [Structure with pyrazolium N⊕—N, CH₃ CH₃, and Cl⊖] | 0.6 | 83 | 86 |
| Water | | 0 | 0 |

EXAMPLE 2

Preparation of 1,2-Dimethyl-3,5-diphenylpyrazolium-2-sec-butyl-4,6-dinitrophenolate 1,2-Dimethyl-3,5-diphenylpyrazolium hydroxide in a water solution is titrated with 2-sec-butyl-4,6-dinitrophenol until pH 7 is obtained. The water soluwherein m, $R_1$, $R_2$, Y, Y', Z, Z' and X are as described for formula I above; and R is hydrogen or lower alkyl of $C_1$–$C_4$.

Since the diketone and hydrazine compounds combine in equimolar quantities, it is preferable to maintain the molar ratio of reactants at about 1:1; however, a slight excess (up to about 10%) of either reactant may be used.

The ring-forming reaction between the hydrazine or alkyl hydrazine and the diketone is preferably carried out by combining the reactants in a solvent and heating to the reaction temperature. Suitable temperatures are in the range of from about 70°C. to about 150°C. and, preferably, between 80°C. and 120°C. Suitable solvents include, for example, aprotic solvents, such as, xylene, toluene, benzene, pyridine, DMSO, DMF, and the like, or protic solvents, such as, $C_1$—$C_4$ alcohols preferably, n- and iso-propanol. Where the latter solvents are employed, high rates of conversion are obtained at temperatures in the range of 80°C. to 85°C.

Where hydrazine is employed in the initial condensation reaction, alkylation of the resulting pyrazole is accomplished with conventional alkylating agents, preferably in the presence of an acid acceptor, such as, an alkali metal hydroxide or alkoxide, or a tertiary organic amine. Suitable bases include, for example, sodium methoxide, sodium hydroxide, triethylamine and the like.

The alkylation reactions are preferably conducted in the presence of a solvent, such as toluene, methylisobutylketone, n- or iso-propanol or an aqueous alcohol solution, such as a mixture of n-propanol and water.

Suitable alkylation reagents include, for example, alkyl halides, alkyl acetates, alkyl sulfates, alkyl nitrates, alkyl phosphates, alkyl carbonates, alkyl hydrogen sulfates, alkyl methyl sulfates and alkyl toluene sulfonates; wherein, said alkyl groups are in the range of from $C_1$—$c_4$ to provide the appropriate alkyl substituent in the formula (I) compound.

The pyrazole and alkylating reagent combine on an equimolar basis. However, it is often preferred to employ an excess of the alkylating agent. Optimum reaction conditions for effecting the alkylations will vary depending on the reactants employed. Reaction is effected by combining the alkylating agent, the pyrazole and, preferably, the acid acceptor and solvent. Reaction often occurs at room temperature. If not, the reaction mixture is heated until the reaction occurs. Where the alkylating reagents employed are volatile, such as, methyl chloride, the reaction is preferably conducted in a sealed vessel under pressure, to avoid loss of the reactants.

Quaternization of the 1-alkylpyrazole is effected by reaction thereof with at least an equimolar quantity of an alkylating agent, such as those mentioned above.

This reaction is preferably conducted in the presence of a solvent, such as, a lower alcohol $C_1$—$C_4$; a ketone, such as, acetone, methyl isobutyl ketone, methyl ethyl ketone or cyclohexanone; a chlorinated hydrocarbon, such as, chloroform; an ether, such as, diethyl ether, methyl ethyl ether or di-n-propyl ether; molar aprotic solvents, such as, dimethyl sulfoxide or dimethylformamide; or, preferably, an aprotic solvent, such as, xylene, toluene or benzene.

The quaternization is effected by mixing the reactants and solvent at temperatures maintained between 35°C. and 150°C., preferably between 50°C. and 125°C.

Since the 1-alkylpyrazole and alkylating reagent combine in equimolar quantities, it is preferred to employ a 1:1 molar ratio thereof; however, an excess of either reagent may be employed.

As in the previously discussed alkylation reaction, where the alkylating agent is volatile at the temperatures used, such as in the case of methyl chloride, it is preferred to use a sealed pressure vessel to conduct the reaction.

Where the diketone selected is asymetrically substituted and $R_1$ differs from $R_2$ in the formula (I) compound to be produced, a mixture of isomers will result from the above synthetic scheme. In such cases, it is generally expedient to employ the isomer mixture in the herbicidal processes of the present invention. Where their separation is desired, however, it may be effected by conventional separation techniques, such as, for example, by fractional crystallization.

In carrying out the above ring closure and alkylation reactions, it may be expedient to initially form a salt having an anion other than that which it is desired to employ in the herbicidal processes of the present invention. In such cases, the exchange in anion may be conveniently made in a subsequent step, such as that graphically depicted below:

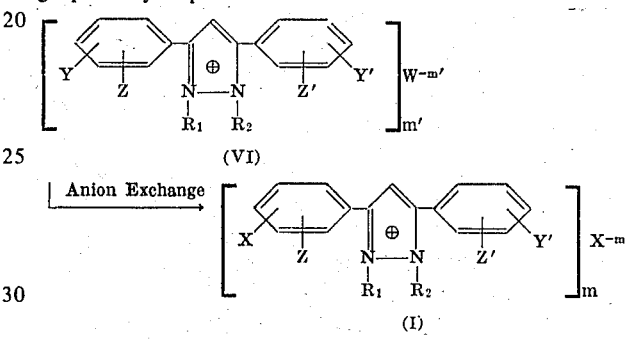

wherein m, $R_1$, $R_2$, Y, Y', Z and Z' are as defined for formula (I) above; $m'$ is an integer selected from 1, 2 and 3; and W is an anion.

The exchange may be effected by treating the initially formed salt with an ion exchange resin. Among the suitable ion exchange resins, one may mention a strong base organic anion exchanger. Illustrative exchangers employ quaternary ammonium salts. Where the resin is supplied as the salt of an anion other than that desired, it is pretreated with an aqueous solution of a salt of the desired anion. For example, if the resin is supplied as a quaternary ammonium chloride and it is desired to produce a pyrazolium nitrate, one would pretreat the resin with an aqueous solution of sodium nitrate.

Other optional subsequent modifications of the anion in the pyrazolium salt may be effected. For example, a pyrazolium chloride may be conveniently converted to the corresponding bromide or iodide by treatment with NaBr or NaI, respectively, in a solvent, such as acetone. A pyrazolium salt, such as the chloride, may be converted to the corresponding perchlorate by treatment of an aqueous solution of said salt with perchloric acid. However, the pyrazolium perchlorates differ measurably from other pyrazolium salts in that they exhibit extremely poor water solubility and are substantially more difficult to formulate since there is about a 100- to 1000-fold difference in their solubilities as compared with the other salts. This results in the precipitation of the less soluble perchlorate salt. The bromides or iodides may be conveniently converted to the tribromides or triiodides by adding bromine or iodine to a solution of the mono-bromide or mono-iodide in a solvent, such as ethanol.

EXAMPLE 3

Preparation of 1-Methyl-3,5-diphenylpyrazole

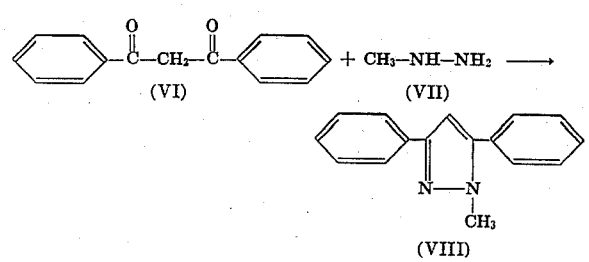

545.0 Grams (2.43 moles) of dibenzoylmethane and 533 ml. of pyridine are stirred together and heated to 80°C. 112 Grams (2.43 moles) of methylhydrazine are then slowly added to the mixture and a strong exothermic reaction ensures necessitating cooling of the mixture with a water bath. When addition is complete, the mixture is heated to reflux and maintained in this condition for 40 minutes. The mixture is then cooled to 30°C., poured into 19 liters of 3N HCl, filtered, and the solid collected. This is reslurried in 198 grams (2.43 moles) of sodium acetate dissolved in 19 liters of water. The mixture is filtered, water washed and air dried to give 535 grams of product, 94.5% yield, having melting point 58°C. to 59°C.

Following the above procedure and substituting ethylhydrazine, n-propylhydrazine, isopropylhydrazine, sec-butylhydrazine, n-butylhydrazine, or isobutylhydrazine for methylhydrazine in the above reaction yields respectively: 1-ethyl-3,5-diphenylpyrazole; 1-n-propyl-3,5-diphenylpyrazole; 1-isopropyl-3,5-diphenylpyrazole; 1-sec-butyl-3,5-diphenylpyrazole; 1-n-butyl-3,5-diphenylpyrazole; and 1-isobutyl-3,5-diphenylpyrazole.

EXAMPLE 4

Reaction of the appropriately substituted dibenzoylmethane with the appropriate alkylhydrazine under the conditions of Example 3 results in the preparation of 1-alkyl-3,5-substituted diphenylpyrazoles. Graphically, the process may be illustrated as follows:

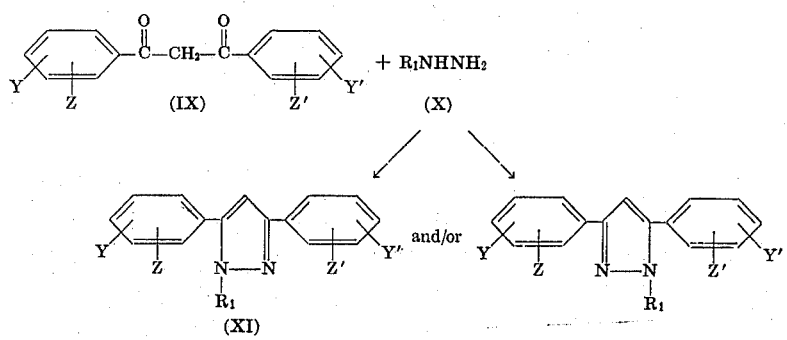

Among the compounds which can be prepared by this reaction are those identified in the Table below. For compounds in this Table, Y' and Z' are both hydrogen.

TABLE II

| Y | Z | $R_1$ | m.p. °C. |
|---|---|---|---|
| Cl (3) | H | $CH_3$ | |
| Cl (4) | H | $CH_3$ | 127.5-128.5 |
| Br (4) | H | $CH_3$ | |
| $CH_3$ (4) | H | $CH_3$ | 101.5-103 |
| $OCH_3$ (3) | H | $CH_3$ | |
| $OCH_3$ (4) | H | $CH_3$ | 105-106.5 |
| Cl(3) | Cl (4) | $CH_3$ | |
| Br (3) | Br (5) | $C_2H_5$ | |
| Br (3) | Cl (4) | $CH_3$ | |
| $CH_3$ (2) | $CH_3$ (6) | $CH_3$ | |
| $OCH_3$ (3) | $OCH_3$ (4) | $C_3H_7$-n | |
| Cl (4) | H | $C_4H_9$-sec | |
| Br (3) | H | $C_3H_9$-n | |
| $CH_3$ (4) | Cl (3) | $CH_3$ | |
| $CH_3$ (3) | $OCH_3$ (4) | $CH_3$ | |
| $OCH_3$ (4) | H | $C_4H_9$-sec | |

EXAMPLE 5

Preparation of 1,2-Dimethyl-3,5-diphenylpyrazolium p-toluene sulfonate

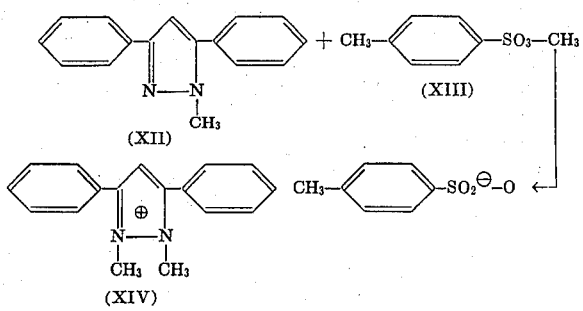

400 Grams (1.71 moles) of 1-methyl-3,5-diphenylpyrazole is dissolved in 2100 ml. of xylene and the solution thus prepared dried by azeotropic distillation. The solution is cooled to 70°C. and 318 grams (1.71 moles) of methyl-p-toluene sulfonate is added. The mixture is then refluxed for one hour and cooled causing the product to crystallize. When the mixture is cooled to 40°C., 1000 ml. of acetone are added. The mixture is filtered, washed with acetone, and dried in vacuo yielding 495 grams (69%) of product having a melting point of 177°C. to 178°C.

EXAMPLE 6

Preparation of 1,2-Dimethyl-3,5-diphenylpyrazolium iodide 5.0 Grams of 1-methyl-3,5-diphenylpyrazole is dissolved in 30 ml. of dry benzene with heating and constant stirring. 30.4 Grams of methyl iodide is added to the mixture, and the mixture heated to reflux. After refluxing for 12 hours, the mixture is cooled and filtered. The filtrate is again refluxed and as product forms, it is separated from the mixture by filtration. The total amount of solid recovered is 1.21 grams, 15% yield, having a melting point of 167°C. to 169°C.

EXAMPLE 7

Preparation of 1,2-Dimethyl-3,5-diphenylpyrazolium hydrogen sulfate and methyl sulfate 5.0 Grams of 1-methyl-3,5-diphenylpyrazole is dissolved in 30 ml. of dry xylene with heating and constant stirring. The solution is cooled to 60°C., and 2.78 grams of dimethyl sulfate is added in 10 ml. of xylene. The mixture is then heated to 100°C. for 6 hours and allowed to cool. After cooling, the mixture is filtered. The solid which is recovered is stirred with dry acetone and the mixture filtered. This yields 3.91 grams of the methyl sulfate, 50.7% yield, having a melting point of 146°C. to 148°C.

The filtrate is then evaporated to remove acetone and the remaining residue is collected. The residue weight of 1.23 grams, 16.6% yield, is the desired hydrogen sulfate having a melting point of 188°C. to 189.5°C.

EXAMPLE 8

Following the general procedures of Example 5, 6 or 7, substituting the appropriately substituted 1-alkyl-3,5 substituted diphenylpyrazole for 1-methyl-3,5-diphenylpyrazole and the appropriate alkyl-p-toluene sulfonate, alkyl halide or alkyl sulfate for the methyl-p-toluene sulfonate, methyl iodide or dimethyl sulfate, yields the corresponding 1,2-dialkyl substituted 3,5-diphenylpyrazolium salt. The reaction is graphically illustrated below:

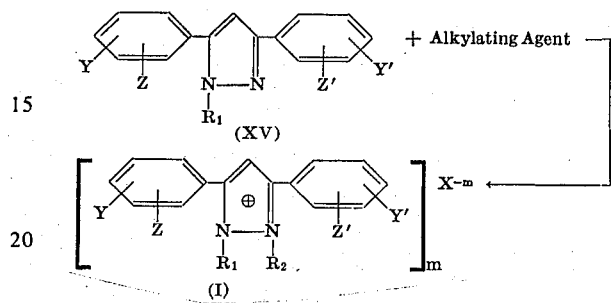

wherein $R_1$, $R_2$, X, Y Y', Z, Z' and m are as described above for (I).

Among the compounds which can be prepared by this reaction are those identified in the table below, where Y' and Z' are both hydrogen.

TABLE III

[Reactants and products]

| Y | Z | $R_1$ | Alkylating agent | $R_2$ | X | Melting point, °C. |
|---|---|---|---|---|---|---|
| Cl (3) | H | $CH_3$ | $CH_3$-⟨⟩-$SO_2$-$OCH_3$ | $CH_3$ | $C_7H_7SO_3$ | ---------- |
| Br (4) | H | $CH_3$ | $CH_3$-⟨⟩-$SO_2$-$OC_2H_5$ | $C_2H_5$ | $C_7H_7SO_3$ | ---------- |
| $CH_3$ (4) | H | $CH_3$ | $(CH_3)_2SO_4$ | $CH_3$ | $CH_3SO_4$ | 174–176 |
| $OCH_3$ (3) | H | $CH_3$ | $CH_3$-⟨⟩-$SO_2$-$OCH_3$ | $CH_3$ | $C_7H_7SO_3$ | ---------- |
| Cl (3) | Cl (4) | $CH_3$ | $CH_3I$ | $CH_3$ | I | ---------- |
| Br (3) | Br (5) | $C_2H_5$ | $C_2H_5I$ | $C_2H_5$ | I | ---------- |
| $CH_3$ (2) | $CH_3$ (6) | $CH_3$ | $n$-$C_3H_7I$ | $C_3H_7$-$n$ | I | ---------- |
| F (3) | H | $CH_3$ | $(CH_3)_2SO_4$ | $CH_3$ | $CH_3SO_4$ | 120–122 |
| $OCH_3$ (3) | $OCH_3$ (4) | $C_3H_7$-$n$ | $i$-$C_3H_7Br$ | $C_3H_7$-$i$ | Br | ---------- |
| Cl (4) | H | $C_4H_9$-$sec$ | $CH_3I$ | $CH_3$ | I | ---------- |
| Cl (4) | H | $C_4H_9$-$sec$ | $sec$-$C_4H_9Br$ | $C_4H_9$-$sec$ | Br | ---------- |
| $CH_3$ (4) | Cl (3) | $CH_3$ | $CH_3I$ | $CH_3$ | I | ---------- |
| $OCH_3$ (4) | H | $CH_3$ | $(CH_3)_2SO_4$ | $CH_3$ | $CH_3SO_4$ | 137–138.5 |
| $OCH_3$ (4) | H | $CH_3$ | $CH_3$-⟨○⟩-$SO_3CH_3$ | $CH_3$ | $C_7H_7SO_3$ | 127.5–129 |
| H | H | $CH_3$ | $(C_2H_5)_2SO_4$ | $C_2H_5$ | $C_2H_5SO_4$ | 109–111 |
| $CH_3$ (4) | H | $CH_3$ | $CH_3$-⟨○⟩-$SO_2OCH_3$ | $CH_3$ | $C_7H_7SO_2$ | 150–151.5 |

EXAMPLE 9

Preparation of 3,5-Diphenylpyrazole 22.4 Grams (0.10 moles) of dibenzoylmethane in 200 ml. of isopropyl alcohol are heated to reflux (approximately 85°C.), and to this is added hydrazine hydrate at a rate sufficient to maintain reflux. Thirty minutes after addition, the reaction is complete. The reaction mixture is permitted to cool and is then poured into water. The desired product as a fine white solid precipitates and is filtered, washed with cold water and dried, yielding 22.1 grams of product, melting point 198.5°C. to 200.5°C.

EXAMPLE 10

Preparation of 1-Methyl-3,5-diphenylpyrazole 5.0 Grams of dibenzoylmethane in 40 ml. of isopropanol is heated to 50°C. The temperature of the reaction mixture is then raised to about 85°C. and 10.5 grams of methyl hydrazine in 10 ml. of isopropanol added thereto. The mixture is heated at this temperature for 30 minutes, then cooled and cold water added thereto. A white solid precipitate forms and is filtered, washed and dried to yield 5.22 grams of product having a melting point of 59.5°C. to 60°C., 99+% yield.

EXAMPLE 11

Preparation of 1,2-Dimethyl-3,5-diphenylpyrazolium Perchlorate 4.7 Grams (0.02 moles) of 1-methyl-3,5-diphenylpyrazole is added to a solution of methyl chloride, 1.5 grams (0.03 moles) in 35 ml. of n-propanol maintained at −40°C. The mixture is then heated to 100°C. and evaporated to a bright green oil. On addition of hexane and cooling, the pyrazolium chloride as a green solid precipitates. The solid is washed with water and dissolved in 60 ml. of $H_2O$ and then $HClO_4$ added. The pyrazolium perchlorate as a white precipitate forms. It is filtered, washed with water and dried to yield the desired product.

EXAMPLE 12

Preparation of 1,2-Dimethyl-3,5-diphenylpyrazolium Methylsulfate

375 Grams (1.6 moles) of 1-methyl-3,5-diphenylpyrazole is dissolved in 1850 ml. of dry xylene and heated to 60°C. 208.13 Grams (1.65 moles) of dimethylsulfate in 150 ml. of dry xylene is then added and the temperature of the reaction mixture raised to 105°C. to 110°C. and maintained there for 7.5 hours. The mixture is allowed to cool and then filtered. A brown solid is recovered, washed with xylene and then dry acetone to give the product an 88% yield, having a melting point of 155°C. to 157°C.

EXAMPLE 13

Preparation of 1,2-Dimethyl-3,5-diphenylpyrazolium bromide

A glass column is packed with a commercial grade of a trimethyl benzyl ammonium chloride, strong base organic anion exchange resin. The resin is washed thoroughly with an aqueous sodium bromide solution of 1 N concentration until $Br^-$ ion is detected in the eluent. Then an aqueous solution of 1,2-dimethyl-3,5-diphenylpyrazolium p-toluene sulfonate is passed down the column at a slow rate. The eluent is concentrated in vacuo, leaving the desired product as a residue after drying with a melting point of 188°C.–189°C.

Analysis: Calcd. for $C_{17}H_{17}N_2Br$: C, 62.01; H, 5.22; N, 8.54; Br, 24.22. Found: C, 61.98; H, 5.30; N, 8.54; Br, 24.27.

EXAMPLE 14

Following the general procedure of Example 13 above, substituting the appropriate sodium salt for the sodium bromide used therein and the appropriate pyrazolium p-toluene sulfonate for that used therein yields the compounds having the following formula and substituents set forth in the table below.

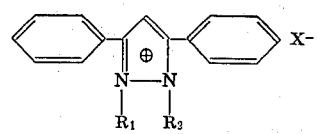

TABLE IV

| Melting Point °C. | $R_1$ | $R_2$ | X |
|---|---|---|---|
| 100.5–103 | $CH_3$ | $CH_3$ | $OH.(3H_2O)$ |
| 56–58 | $CH_3$ | $CH_3$ | $½ SO_4.(2H_2O)$ |
| 140–141.5 | $CH_3$ | $CH_3$ | $NO_3$ |
| 188–189 | $CH_3$ | $CH_3$ | Br |
| 179.5–181 | $CH_3$ | $CH_3$ | $Cl.½ H_2O$ |
| 168–169 | $CH_3$ | $CH_3$ | I |

EXAMPLE 15

Preparation of 1,2-Dimethyl-3,5-diphenylpyrazolium perchlorate

To a solution of 1,2-dimethyl-3,5-diphenylpyrazolium p-toluene sulfonate (10.0 g.) in 500 ml. of water is added a 20% aqueous solution of perchloric acid with vigorous stirring. The product separates immediately as a white solid. It is collected by filtration, washed with water and dried to give 8.3g. of the desired product having a melting point of 183°C.–184°C., and the following elemental analysis:

Calcd. for $C_{17}H_{17}ClN_2O_4$: C, 58.75; H, 4.92; N, 8.05. Found: C, 58.21; H, 4.84; N, 7.95.

EXAMPLE 16

Following the general procedure of Example 15, substituting the appropriate pyrazolium p-toluene sulfonate for that used therein results in the formation of the perchlorates set forth in the table below.

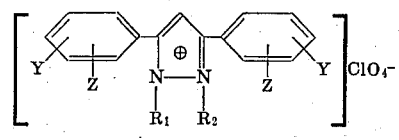

TABLE V

| Substituents | | | | m.p. °C. |
|---|---|---|---|---|
| Y | Z | $R_1$ | $R_2$ | |
| H | H | $CH_3$ | $-C_3H_7-n$ | 145–146.5 |

EXAMPLE 17

Preparation of 1,2-Dimethyl-3,5-diphenylpyrazolium triiodide

To a solution of 2.0 grams (0.0053 moles) of 1,2- dimethyl-3,5-diphenylpyrazolium iodide in 100 ml. of aqueous ethanol (1:1) was added 1.34 grams (0.0053 moles) of iodine. The reaction mixture was allowed to sit with the resultant formation of a red precipitate.

The precipitate was collected by filtration, washed with aqueous ethanol and air dried to produce 3.0 grams of the desired triiodide having a melting point of 108°–110°C. and the following elemental analysis:

Calculated: C, 32.41%; H, 2.72%; H, 4.44%; I, 61.45%
Found: C, 32.23%; H, 2.78%; N, 4.43%; I, 60.29%.

EXAMPLE 18

Following the general ring closing procedure of Example 3 and the alkylation procedure of Example 8, employing methylhydrazine and the appropriate diketones and alkylating agents yields the pyrazolium salts of the following formula, having the substituents set forth in the table below.

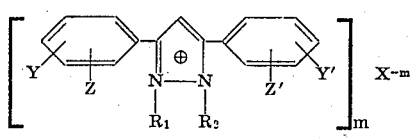

I claim:

1. A composition for the control of wild oats and broadleaf weeds comprising an inert carrier and a mixture of:
   a. a pyrazolium salt of the formula:

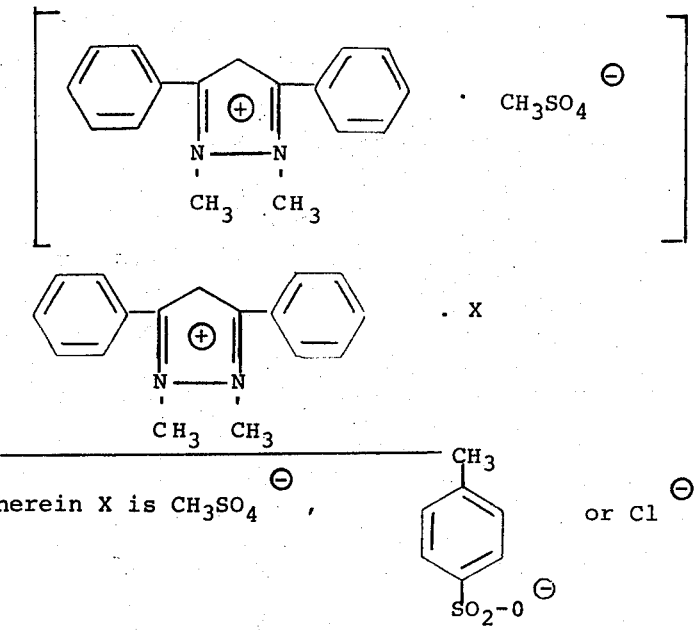

and
   b. 3,5-dibromo-4-hydroxybenzonitrile wherein the composition is applied to the undesirable plants in sufficient amount to provide from 0.25 pound to 2.0 pounds per acre of pyrazolium cation and from 0.125 pound to 4.0 pounds per acre of 3,5-bromo-4-hydroxybenzonitrile.

2. A composition according to claim 1 wherein the pyrazolium salt is 1,2-dimethyl-3,5-diphenylpyrazolium methyl sulfate.

3. A composition according to claim 1 wherein the pyrazolium salt is 1,2-dimethyl-3,5-diphenylpyrazolium chloride.

4. A composition according to claim 1 wherein the pyrazolium salt is 1,2-methyl-3,5diphenylpyrazolium-p-toluene sulfonate.

5. A method for the control of wild oats and broadleaf weeds or other undesirable grasses comprising applying to the foliage of said undesirable plant species a herbicidally effective amount of a composition according to claim 1.

TABLE VI

| | | Substituents | | | | | Melting |
| X | Y | Y' | Z | Z' | $R_1$ | $R_2$ | point, °C. |
|---|---|---|---|---|---|---|---|
| —OSO₂—⟨⟩—CH₃ | H | Cl (4) | H | H | $CH_3$ | $CH_3$ | 177.5–179 |
| —O—SO₃—CH₃ | H | Cl (4) | H | H | $CH_3$ | $CH_3$ | >340 |
| —O—SO₃—CH₃ | H | Cl (4) | H | H | $CH_3$ | $CH_3$ | 217–219 |
| ClO₄ | H | Cl (4) | H | H | $CH_3$ | $CH_3$ | 136.5–138 |
| ClO₄ | H | H | H | H | $CH_3$ | $C_3H_7$–n | 145–146.5 |
| C₂H₅O—SO₂—O | H | H | H | H | $CH_3$ | $C_2H_5$ | 109–111 |
| CH₃O—SO₂—O | H | Cl (4) | H | H | $CH_3$ | $CH_3$ | 136.5–138 |
| CH₃O—SO₂—O | H | CH₃ (4) | H | H | $CH_3$ | $CH_3$ | 107–110 |
| ClO₄ | H | Cl (3) | H | H | $CH_3$ | $CH_3$ | 157–160 |
| ClO₄ | H | Cl (2) | H | H | $CH_3$ | $CH_3$ | 124–128 |
| CH₃O—SO₂—O | H | CH₃ (3) | H | H | $CH_3$ | $CH_3$ | 97–100 |
| ClO₄ | H | CH₃ (2) | H | H | $CH_3$ | $CH_3$ | 166–170 |
| ClO₄ | H | CH₃O (4) | H | H | $CH_3$ | $CH_3$ | 152–156 |
| CH₃O—SO₂—O | H | Cl (3) | H | Cl (5) | $CH_3$ | $CH_3$ | 162–164 |
| HSO₄ | H | Cl (2) | H | H | $CH_3$ | $CH_3$ | (¹) |
| CH₃O—SO₂—O | H | CH₃ (2) | H | H | $CH_3$ | $CH_3$ | (²) |
| ClO₄ | Cl (3) | H | Cl (5) | H | $CH_3$ | $CH_3$ | 183–185 |
| CH₃O—SO₂—O | Cl (3) | H | Cl (4) | H | $CH_3$ | $CH_3$ | 152–153 |

¹ Purple gum.  ² Brown gum.

6. A method according to claim 5 wherein the pyrazolium salt is 1,2-dimethyl-3,5-diphenylpyrazolium methyl sulfate.

7. A method according to claim 5 wherein the pyrazolium salt is 1,2-dimethyl-3,5-diphenylpyrazolium chloride.

8. A method according to claim 5 wherein the pyrazolium salt is 1,2-dimethyl-3,5-phenylpyrazolium-p-toluene sulfonate.

* * * * *